J. A. DOUGLASS.
VEHICLE JACK.
APPLICATION FILED MAR. 28, 1913.
1,100,547.
Patented June 16, 1914.
2 SHEETS—SHEET 2.
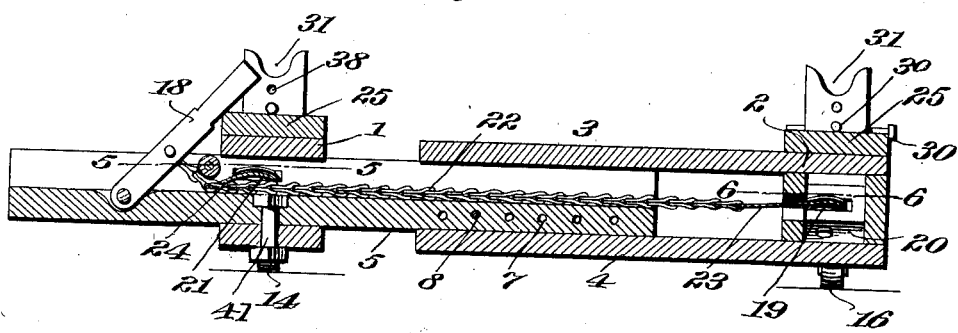
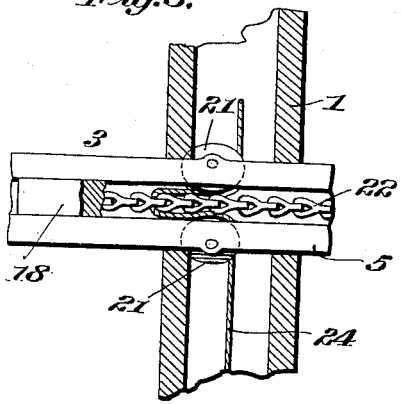
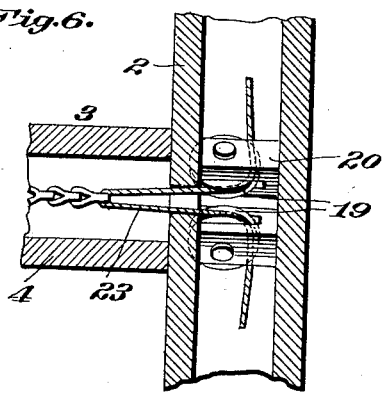
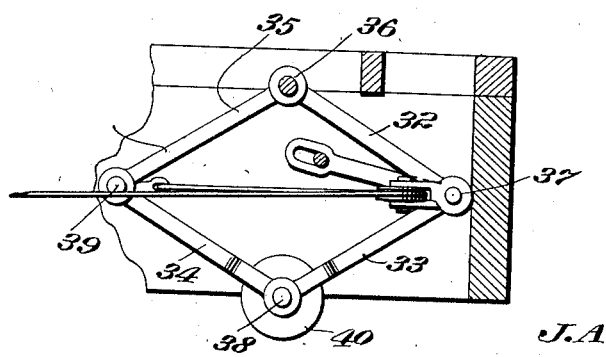
Witnesses
G. C. Hennesy
J. W. Garner
Inventor
J. A. Douglass
By Victor J. Evans
Attorney

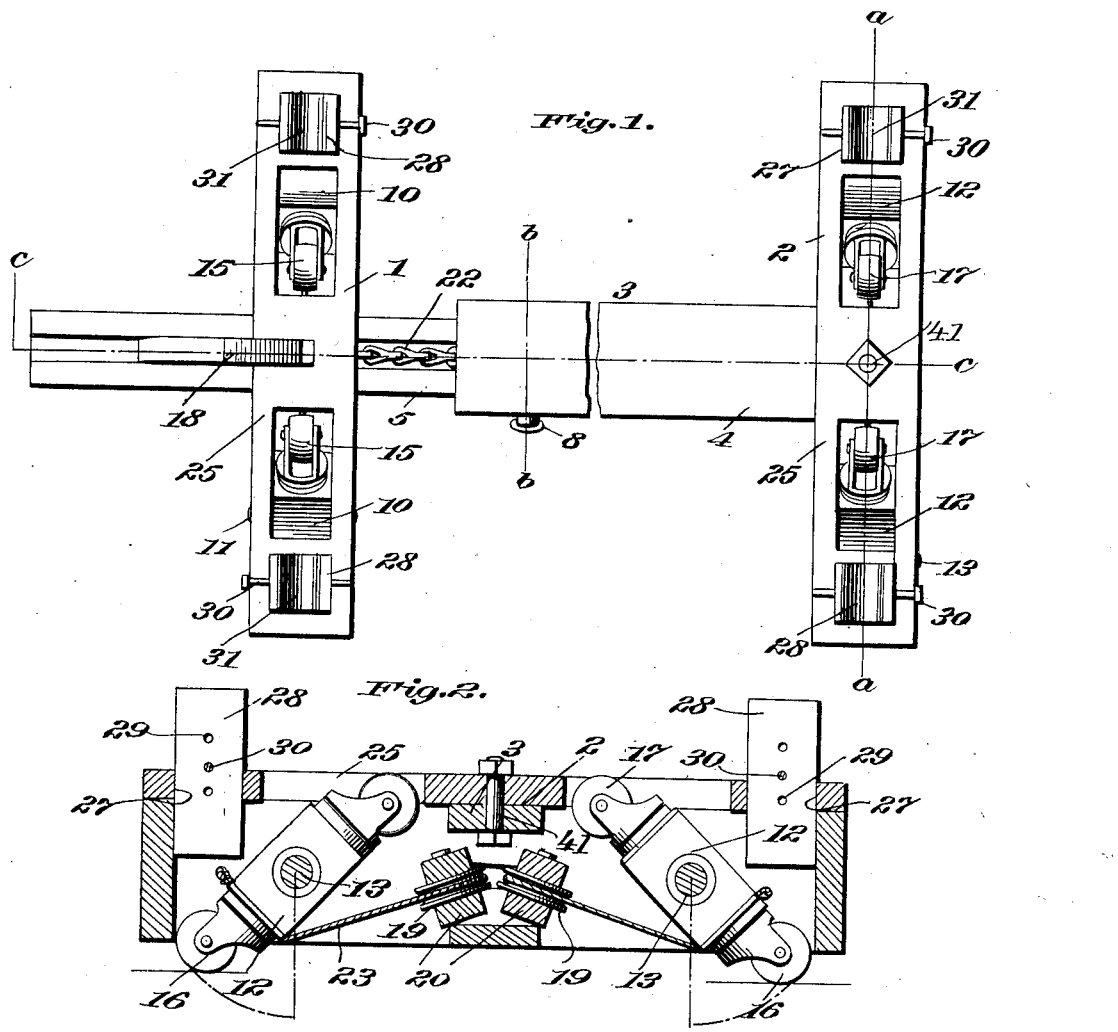

UNITED STATES PATENT OFFICE.

JOHN A. DOUGLASS, OF AUSTIN, TEXAS.

VEHICLE-JACK.

1,100,547.

Specification of Letters Patent.

Patented June 16, 1914.

Application filed March 28, 1913. Serial No. 757,401.

*To all whom it may concern:*

Be it known that I, JOHN A. DOUGLASS, a citizen of the United States, residing at Austin, in the county of Travis and State of Texas, have invented new and useful Improvements in Vehicle-Jacks, of which the following is a specification.

This invention is an improved vehicle jack especially adapted for use with an automobile to support the same when in a garage or other place when not in use, and prevent the weight of the automobile from bearing on the wheels and tires thereof, thus avoiding injury to the tires, the jack also forming a truck enabling the same when supporting an automobile to be wheeled in any direction desired, the invention consisting in the construction, combination and arrangement of devices hereinafter described and claimed.

One object of my invention is to effect improvements in the construction of the jack whereby the same is provided with a plurality of supporting legs, for raising and lowering the same, and with a single lever for simultaneously operating all of the supporting legs.

Another object is to effect improvements in the construction of the jack whereby the same may be lengthened or shortened at will and adapted for use in connection with automobiles or other vehicles of various sizes.

Another object of the invention is to provide an improved jack of this kind which is so low that a car or vehicle may be readily driven with its wheels astride of the jack and its body arranged above the same and the jack then employed for raising the car or vehicle clear of the floor or ground.

In the accompanying drawing: Figure 1 is a plan of a vehicle jack constructed in accordance with my invention. Fig. 2 is a transverse sectional view of the same on the plane indicated by the line *a—a* of Fig. 1. Fig. 3 is a similar view on the plane indicated by the line *b—b* of Fig. 1. Fig. 4 is a longitudinal vertical sectional view of the same on the plane indicated by the line *c—c* of Fig. 1. Fig. 5 is a horizontal sectional view of the same on the plane indicated by the line 5—5 of Fig. 4. Fig. 6 is a sectional view similar to Fig. 5 and on the plane indicated by the line 6—6 of Fig. 4. Fig. 7 is a detail elevation, showing a modified construction of supporting member for raising and lowering the jack.

In accordance with my invention, I provide front and rear hollow transverse bars 1 and 2 which are here shown as open on their upper and lower sides. A reach 3 connects the transverse bars together and is longitudinally extensible, comprising a tubular member 4, the rear end of which is secured to the center of the rear bar 2 and a member 5 which enters and is longitudinally movable in the tubular member 4 and also passes through a central opening in the front bar 1 and is secured to said bar. This member 5 is provided with a longitudinal channel in its upper side and is also provided with a series of adjusting openings 7 which extend transversely therethrough at points below the bottom of the channel. A pin 8 is fitted in openings 9 in the sides of the tubular member 4 and may be placed in any of the openings 7 so as to secure the member 5 at any desired longitudinal adjustment in the member 4 and, hence, adjust the reach longitudinally as may be required to arrange the bars 1—2 at any desired distance apart.

A pair of supporting legs 10 are pivotally mounted, at points intermediate their ends as at 11, in opposite ends of the bar 1. A similar pair of legs 12 are correspondingly and pivotally mounted as at 13 in opposite ends of the bar 2. The legs 10 have casters 14—15, respectively, at their lower and upper ends and the legs 12 have casters 16—17, respectively, on their lower and upper ends.

A lever 18 is pivotally mounted in the member 5 of the reach, with its lower end arranged in the channel of said member and, hence, the said lever when in horizontal outwardly extended position is adapted to fit in the channel and entirely out of the way. A pair of direction pulleys 19 are mounted in supports 20 at the center of the rear bar 2. A pair of direction pulleys 21 are mounted in openings in the sides of the reach member 5 at a point coincident with the space between the vertical side walls of the bar 1.

A chain 22 is attached to the lever, extends rearwardly therefrom and is arranged in the channel of the reach member 5. A cord, chain or other suitable flexible element 23 which is doubled, has its bight portion connected to the chain. This cord or flexible element 23 engages the direction pulleys 19 and its ends are attached to the lower ends of the supporting legs 12. A similar chain, cord, or other flexible connecting element 24 is connected at its center to the chain 22 and has its ends attached to the lower ends of the supporting legs 10. Hence, by moving the lever in one direction, the chain attached to the said lever by drawing upon the cords 23—24 causes the cords to draw inwardly on the lower ends of the supporting legs, so as to turn the supporting legs from an inclined position approximately to a vertical position, and, hence, cause the angular movement of said supporting legs to raise the jack a slight distance. By turning the lever in the reverse direction, the chain or cords are relaxed so that the weight of the jack serves to turn the supporting legs outwardly in opposite directions and thus lower the jack nearly to the level of the ground or floor. In both positions of the jack, whether lowered or raised, the casters on the lower ends of the supporting legs bear on the ground or floor, thus enabling the jack to be readily moved in any required direction both when loaded or when unloaded. A pair of bolsters 25 are secured transversely on the jack near its front and rear ends and are provided near their ends with openings 27. Standards 28 have their lower ends arranged in the said openings and are vertically adjustable therein, the said standards being provided with transverse adjusting openings 29 suitable pins 30 being provided which, by fitting in any of these adjusting openings and bearing on the bolsters serve to support the standards and adjust them to any desired height. The standards are provided with forks or bifurcations 31 in their upper ends which may be engaged with the axles or other suitable parts of an automobile or other vehicle under which the jack has been run and, hence, when the standards have been adjusted properly and the jack has been raised, the automobile or other vehicle will be raised by the jack and supported with its wheels clear of the ground or floor. When thus used in connection with an automobile, the weight of the latter is entirely prevented from being imposed on its tires and, hence, injury to the tires caused by the resting of the automobile thereon when not in use is entirely obviated. Owing to the fact that the reach of my improved jack is longitudinally adjustable, the jack may be used with vehicles or automobiles of different lengths.

In Fig. 7 of the drawing, I show a modified construction of supporting members which may be used instead of the supporting legs hereinbefore described. This modified supporting member comprises links 32, 33, 34 and 35 pivotally connected together at 36, 37, 38 and 39, a supporting foot or roller 40 being at the lower side of the device at the point 38. The jointed frames formed by these links may be connected to the bars of the jack in lieu of the supporting legs and the cords may be appropriately connected to the said jointed frames so that when the cords are pulled by the operation of the lever, the sides of the jointed frames will be drawn toward each other and their feet or rollers 40 lowered, thus raising the jack. The members of the reach are detachably connected to the bars 1 and 2, respectively, and by removing the bolts 41 which connect the reach members to the said bars, the reach members may be entirely detached from the bars and all the parts of the jack may be arranged parallel to each other so as to compactly dispose the jack for storage or transportation. The frame of the jack may be made of metal, wood or any other suitable material.

While I have herein shown and described a preferred embodiment of my invention, I would have it understood that changes may be made in the form, proportion and construction of the several parts without departing from the spirit of my invention and within the scope of the appended claims.

I claim:—

1. A jack of the class described comprising a pair of cross bars, a tubular reach member connected to one of the cross bars, a reach member having a longitudinal channel in its upper side and slidably connected to and arranged in the tubular reach member, said channel reach member being connected to the other cross bar, a lever pivotally mounted in the channel of the channeled reach member, supporting members mounted in the cross bars, a chain connected to the lever, flexible elements connecting the supporting members to the said chain and extending into the channel of the channeled member and direction elements for the said flexible elements.

2. A jack of the class described comprising a pair of cross bars, a reach connecting the cross bars, supporting legs pivotally mounted in the cross bars for vertical angular movement, a lever, a chain connected to the lever, flexible elements connecting the pivotally mounted supporting legs in pairs, said flexible elements being connected to the chain, and direction elements for said flexible elements.

In testimony whereof I affix my signature in presence of two witnesses.

JOHN A. DOUGLASS.

Witnesses:
D. H. HART, Jr.,
E. P. CRAVENS.